US009069386B2

(12) United States Patent
Ajika

(10) Patent No.: US 9,069,386 B2
(45) Date of Patent: Jun. 30, 2015

(54) GESTURE RECOGNITION DEVICE, METHOD, PROGRAM, AND COMPUTER-READABLE MEDIUM UPON WHICH PROGRAM IS STORED

(75) Inventor: Satoshi Ajika, Tokyo (JP)

(73) Assignee: NIPPON SYSTEMWARE CO., LTD., Tokyo (JP)

( * ) Notice: Subject to any disclaimer, the term of this patent is extended or adjusted under 35 U.S.C. 154(b) by 368 days.

(21) Appl. No.: 13/697,172

(22) PCT Filed: May 9, 2011

(86) PCT No.: PCT/JP2011/060655
§ 371 (c)(1),
(2), (4) Date: Nov. 9, 2012

(87) PCT Pub. No.: WO2011/142317
PCT Pub. Date: Nov. 17, 2011

(65) Prior Publication Data
US 2013/0057469 A1    Mar. 7, 2013

(30) Foreign Application Priority Data
May 11, 2010    (JP) .................................. 2010-109528

(51) Int. Cl.
*G06F 3/01*    (2006.01)
*G06K 9/00*    (2006.01)
*G06T 7/00*    (2006.01)

(52) U.S. Cl.
CPC ............ *G06F 3/017* (2013.01); *G06K 9/00355* (2013.01); *G06T 7/0042* (2013.01); *G06T 2207/10016* (2013.01); *G06T 2207/30196* (2013.01)

(58) Field of Classification Search
CPC .................................................. G06F 3/017
USPC ................................ 715/863, 208, FOR. 208
See application file for complete search history.

(56) References Cited

U.S. PATENT DOCUMENTS

2005/0025345 A1* 2/2005 Ohta et al. .................... 382/116

FOREIGN PATENT DOCUMENTS

JP    2001-273503    10/2001
JP    2001-273503 A  * 10/2001

(Continued)

OTHER PUBLICATIONS
Tatsuaki Iwata, "3-D Information Input System Based on Hand Motion Recognition by Image Sequence Processing", IEICE Technical Report, Jan. 16, 2001, vol. 100, No. 634, pp. 29 to 36 (English language translation).*

(Continued)

*Primary Examiner* — Julie Anne Watko
(74) *Attorney, Agent, or Firm* — Berenato & White, LLC

(57) ABSTRACT

The present invention provides a gesture recognition device which can accurately recognize a user's gesture in a free space with a simple configuration, and which is mounted on a processing unit and which causes the processing unit to execute an operation corresponding to the recognized gesture. The gesture recognition device (1000) comprises a palm centroid determining unit (30) for determining centroid of a palm, a palm area determining unit (40) for determining the area of a palm, a finger length/angle determining unit (50) for calculating length of finger by obtaining the length between the centroid and the fingertips and for calculating the angles formed by lines connecting the centroid and the fingertips, and a gesture identifying unit (60) for identifying the gesture by the combination of the variation of the centroid of the palm, the change of the palm area, the change of length between the centroid and the fingertips and the change of angles formed by the lines connecting the centroid and the fingertips.

10 Claims, 14 Drawing Sheets

(56) References Cited

FOREIGN PATENT DOCUMENTS

| JP | 2005-50177 | | | 2/2005 |
|---|---|---|---|---|
| JP | 2008-40576 | | | 2/2008 |
| JP | 2008-40576 | A | * | 2/2008 |
| JP | 2009-20691 | | | 1/2009 |
| JP | 2009-20691 | A | * | 1/2009 |
| JP | 2009-42796 | | | 2/2009 |
| JP | 2009-42796 | A | * | 2/2009 |

OTHER PUBLICATIONS

Koken Soeishi, "Recognition of human fingers' shape for control robot hand", IEICE Technical Report, Jun. 22, 2001, vol. 101, No. 154, pp. 21 to 25 (English language translation).*

Ryo Takamatsu, "Pointing Device Based on Tracking and Recognition of Hand with Local Moments", Journal of Human Interface Society, Feb. 26, 1999, vol. 1, No. 1, pp. 45 to 52 (English language translation).*

Tatsuaki Iwata, "3-D Information Input System Based on Hand Motion Recognition by Image Sequence Processing", IEICE Technical Report, Jan. 16, 2001, vol. 100, No. 634, pp. 29 to 36.

Koken Soeishi, "Recognition of human fingers' shape for control robot hand", IEICE Technical Report, Jun. 22, 2001, vol. 101, No. 154, pp. 21 to 25.

Ryo Takamatsu, "Pointing Device Based on Tracking and Recognition of Hand with Local Moments", Journal of Human Interface Society, Feb. 26, 1999, vol. 1, No. 1, pp. 45 to 52.

* cited by examiner

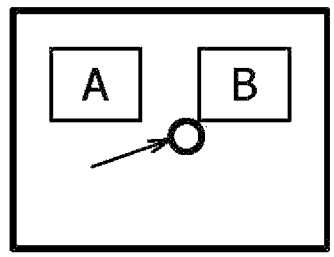
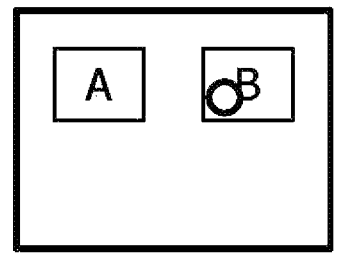
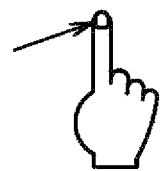
FIG.6A
FIG.6B
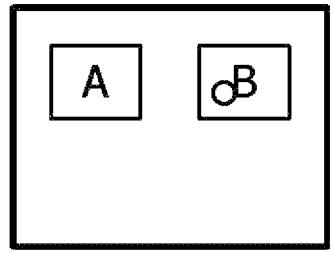
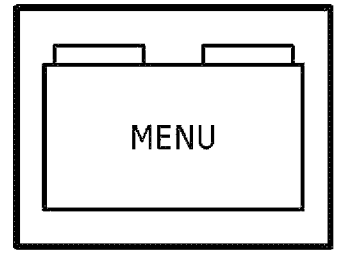
FIG.6C
FIG.6D

US 9,069,386 B2

GESTURE RECOGNITION DEVICE, METHOD, PROGRAM, AND COMPUTER-READABLE MEDIUM UPON WHICH PROGRAM IS STORED

This application is a U.S. National Phase of PCT/JP2011/060655, filed May 9, 2011, which claims the priority of Japanese patent application JP 2010-109528, filed May 11, 2010.

BACKGROUND OF THE INVENTION

The present invention relates to a gesture recognition device, a method for recognizing a gesture, a program for executing the method for recognizing a gesture, and a computer readable medium storing the program.

Kinds of input devices, e.g., a mouse, a trackball, a joystick, and a touch panel, for operating a personal computer are on the market. These input devices give users intuitive operations, which is different from keyboards.

Especially, touch panels are different from other input devices. Since the touch panels do not require a work space and various operations can be made by touching the display with fingers or pens, they are mounted on portable terminals, car navigation system, office automation equipments, portable telephones, and others.

However, the touch panel may be damaged or unclean by the fingers and pens. The device to resolve the problems of the touch panel is a gesture recognition device. Japan Unexamined Patent Publication No. 2004-78977 discloses one of gesture recognition devices. The gesture recognition device takes images of a gesture of a hand in a free space by a camera, identifies the gesture based on the images and causes a processing unit to execute the operation corresponding to the gesture. Because being not touched during operation, the display of the gesture recognition device does not receive bad influences from operations.

SUMMARY OF THE INVENTION

Since a user's gesture is made in a free space, the behavior thereof is complicated and unstable. Accordingly, it is difficult to determine whether a gesture is a user's intentional motion or a user's unintentional motion, or to recognize a start point and an end point of a specific gesture or the like. Since a gesture in three-dimensional motion is imaged with a camera and it is determined with a two-dimensional image, a motion in a direction getting closer to and farther from a camera and a motion in a vertical direction and a horizontal direction relative to the camera cannot be clearly distinguished from each other. For the purpose of clear distinction, a complicated configuration of imaging a gesture with plural cameras has to be used.

An object of the invention is to provide a gesture recognition device which can accurately recognize a user's gesture in a free space with a simple configuration, a gesture recognition method using the gesture recognition device, a program for executing the gesture recognition method, and a computer-readable medium storing the program.

Another object of the invention is to provide a gesture recognition device which can accurately recognize a start and an end of a gesture, a gesture recognition method using the gesture recognition device, a program for executing the gesture recognition method, and a computer-readable medium storing the program.

Still another object of the invention is to provide a gesture recognition device which can provide a more intuitive operation to a user, a gesture recognition method for recognizing a gesture, a program for executing the gesture recognition method, and a computer-readable medium storing the program.

In order to accomplish the above objects, a gesture recognition device of the present invention is a gesture recognition device mounting on a processing unit, recognizing a gesture of a human hand in a free space through a moving image, and causing the processing unit to execute a predetermined operation corresponding to the recognized gesture. The gesture recognition device comprises a palm centroid determining unit for determining a centroid of a palm of the hand, a palm area determining unit for determining the area of the palm of the hand, a finger length determining unit for calculating length between the centroid of the palm and fingertips, a finger angle determining unit for calculating angles formed by lines connecting the centroid and the fingertips, a gesture identifying unit for identifying the gesture from a combination of a variation of the centroid of the palm, a variation of the area of the palm, a variation of the area of the palm, and a variation of the angles formed lines connecting the centroid and the fingertips.

In the above gesture recognition device, the gesture identifying unit determines that the hand is moved in any of directions of up, down, left and right when the centroid of the palm of the hand is varied.

Further, the gesture identifying unit determines that the hand is moved in any of directions of up, down, left and right when the area of the palm of the hand is varied.

Furthermore, the gesture identifying unit determines that the shape of the fingers is changed when the area of the palm is stable and the length between the centroid of the palm and the fingertips is varied.

Further, the gesture identifying unit determines the palm is rotated when the angles formed by lines connecting the centroid and the fingertips are varied.

The gesture is one of a gesture showing a start of operation, a gesture showing execution of operation, and a gesture showing an end of operation.

The gesture showing an end of operation is recognized in a case that the centroid of the palm is moved downward, that the area of the palm decreases, and that the length between the centroid and the fingertips is made shorter.

In the gesture recognition device, the operations executed by the processing unit is to display a menu on a screen of the processing unit, to change an object displayed on the screen of the processing unit, to move and rotate the object displayed on the screen of the processing unit, and to transmit a plurality of images displayed on the screen of the processing unit frame by frame or scroll.

In the gesture recognition device, the gesture identifying unit recognizes plural gestures simultaneously, and causes the processing unit to execute operations corresponding to the recognized gestures simultaneously.

In the gesture recognition device, the processing unit is one of a personal computer, a portable terminal, a car navigation system, and a portable telephone.

Further, in order to accomplish the above objects, a method of the present invention is a method for recognizing a gesture of a human hand in a free space through a moving image, and causing a processing unit to execute a predetermined operation corresponding to the recognized gesture. The method for recognizing a gesture comprises a step of determining a centroid of a palm of the hand, a step of determining the area of the palm of the hand, a step of calculating length between the centroid of the palm and fingertips, a step of calculating angles formed by lines connecting the centroid and the fingertips, a step of identifying the gesture from a combination of a variation of the centroid of the palm, a variation of the area of the palm, a variation of the area of the palm, and a variation of the angles formed by lines connecting the centroid and the fingertips.

In the step of identifying a gesture; it is determined that the hand is moved in any of directions of up, down, left and right when the centroid of the palm of the hand is varied.

In the step of identifying a gesture; it is determined that the hand is moved in any of directions of up, down, left and right when the area of the palm of the hand is varied.

In the step of identifying a gesture, it is determined that the shape of the fingers is changed when the area of the palm is stable and the length between the centroid of the palm and the fingertips is varied.

In the step of identifying a gesture, it is determined that the palm is rotated when the angle formed by lines connecting the centroid and the fingertips is varied.

Furthermore, in order to accomplish the above objects, electronic circuit of the present invention is to perform the above method of recognizing a gesture.

A program of the present invention is a program for causing a processing unit to execute the above method of the present invention for recognizing a gesture.

A computer readable medium of the present invention is a computer readable medium storing the above program.

According to the present invention, it is possible to provide a gesture recognition device with higher recognition accuracy, a gesture recognition method, a program for executing the gesture recognition method, and a computer-readable medium storing the program. The invention can be embodied by a simple system including a single imaging device and a processing unit such as a personal computer.

According to the invention, it is possible to determine a start and an end of a gesture and to distinguish an intentional motion and an unintentional motion from each other, and it is thus possible to provide various intuitive operations to a user.

BRIEF DESCRIPTION OF DRAWINGS

FIGS. 6A-6D are diagrams illustrating Example 1 of the gesture recognition method which is performed by the gesture recognition device according to an embodiment of the invention.

DETAILED DESCRIPTION OF INVENTION

The configuration or function of a gesture recognition device according to an embodiment of the present invention will be described below in detail with reference to the accompanying drawings. The gesture recognition device is mounted on a processing unit such as a computer and has a function of recognizing a gesture of a user's hand through the use of a moving image and causing the processing unit to execute an operation corresponding to the recognized gesture. Particularly, the gesture recognition device has a function of identifying a user's gesture by combining a displacement in centroid of a palm, a variation in area of the palm, a variation in distance from the centroid of the palm to a fingertip, and a variation in angle of a line connecting the centroid of the palm to each fingertip.

Figure 1:
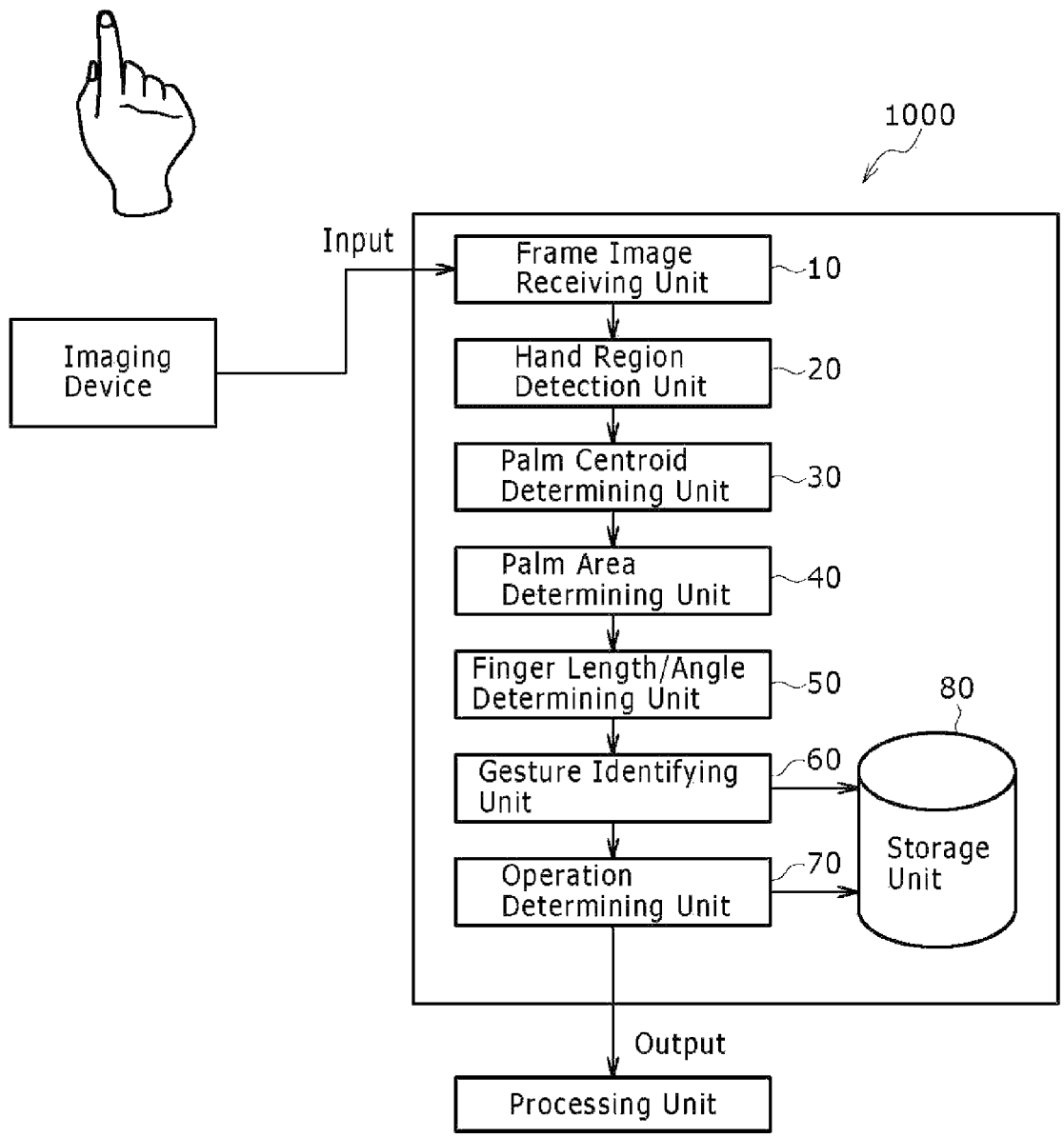
FIG. 1 is a functional block diagram illustrating a gesture recognition device according to an embodiment of the invention.

FIG. 1 is a functional block diagram illustrating a gesture recognition device 1000 according to an embodiment of the invention. As shown in the drawing, the object recognition device 1000 includes as functional elements a frame image receiving unit 10, a hand region detecting unit 20, a palm centroid determining unit 30, a palm area determining unit 40, a finger length/angle determining unit 50, a gesture identifying unit 60, an operation determining unit 70, and a storage unit 80. An imaging device is connected to an input stage thereof and a processing unit is connected to an output stage thereof. The imaging device has a function of imaging a user's hand at a predetermined frame rate and outputting the imaged data as moving image data of a predetermined format. A general-purpose video camera may be used as the imaging device. A general-purpose computer may be used as the processing unit.

Frame Image Receiving Unit

The frame image receiving unit 10 has a function of receiving moving image data from the imaging device. Specifically, the frame image receiving unit receives the moving image data of a predetermined format created by the imaging device and converts the moving image data into a data format which can be processed by a functional element in the subsequent stage if necessary.

Hand Region Detecting Unit

The hand region detecting unit 20 has a function of calculating a region of a hand in plural frame images constituting the moving image data received from the frame image receiving unit 10. The method of calculating a region of a hand is not particularly limited, and existing techniques may be used. For example, a template matching technique may be used. Alternatively, a technique of irradiating a hand with light such as infrared light and detecting a region of a hand by the use of the reflected light may be used, which is disclosed in Japan unexamined Patent Publication No. 2007-43311. The pixel coordinates of the detected region of a hand are sent to the palm centroid determining unit 30.

Palm Centroid Determining Unit

The palm centroid determining unit 30 has a function of calculating the centroid of a palm in the region of a hand detected by the hand region detecting unit 20. A method of calculating the centroid of a palm will be described below with reference to FIGS. 2A-2D.

1) A portion which is the largest in the horizontal direction in the region of a hand is detected. The center of the detected portion in the horizontal direction is set as a assumed centroid (see FIG. 2A).

Figure 2A:
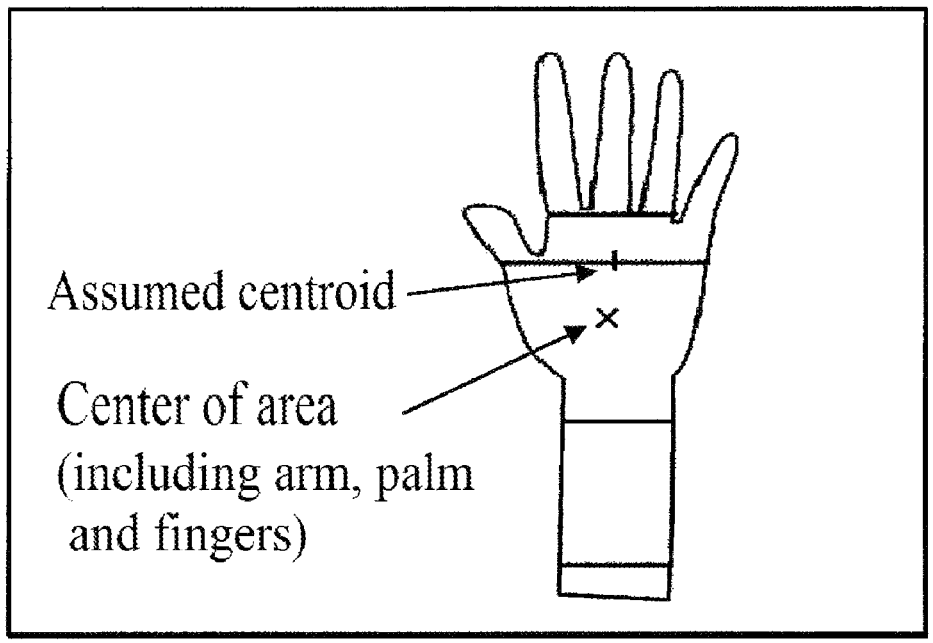
FIGS. 2A-2D are diagrams illustrating a method of calculating the centroid of a palm, which is performed by a palm centroid determining unit according to an embodiment of the invention.
Figure 2B:
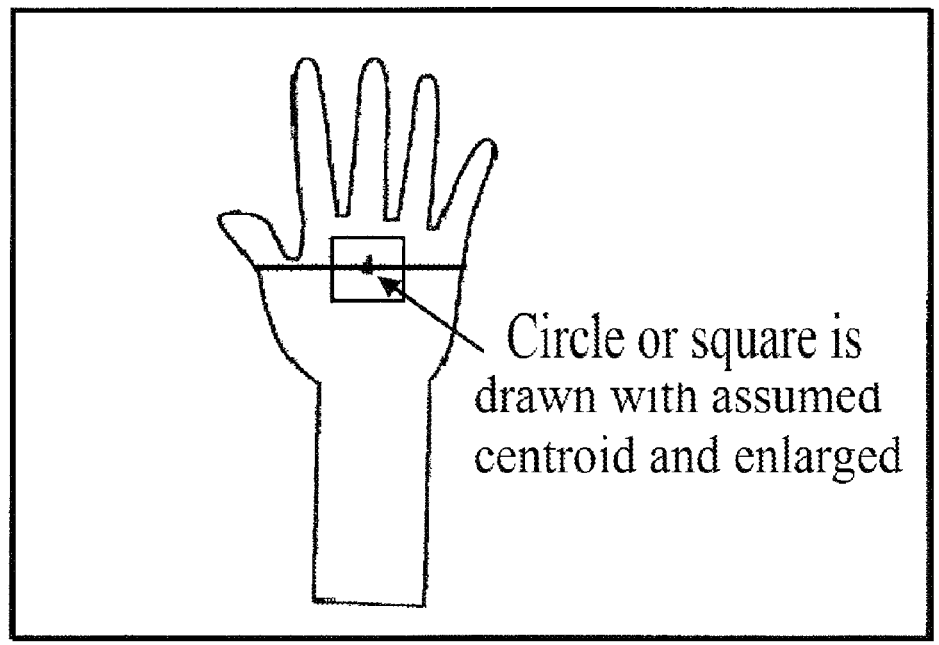

2) A square smaller than the region of a hand is drawn with the assumed centroid as a center (see FIG. 2B).

Figure 2C:
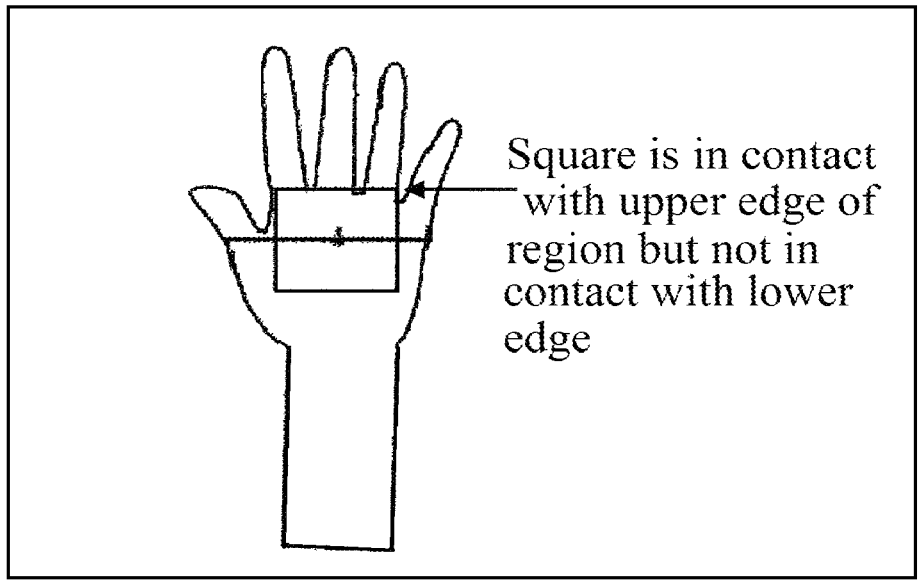

3) The square is enlarged until at least one side of the drawn square comes in contact with any edge of the region of a hand (see FIG. 2C).

Figure 2D:
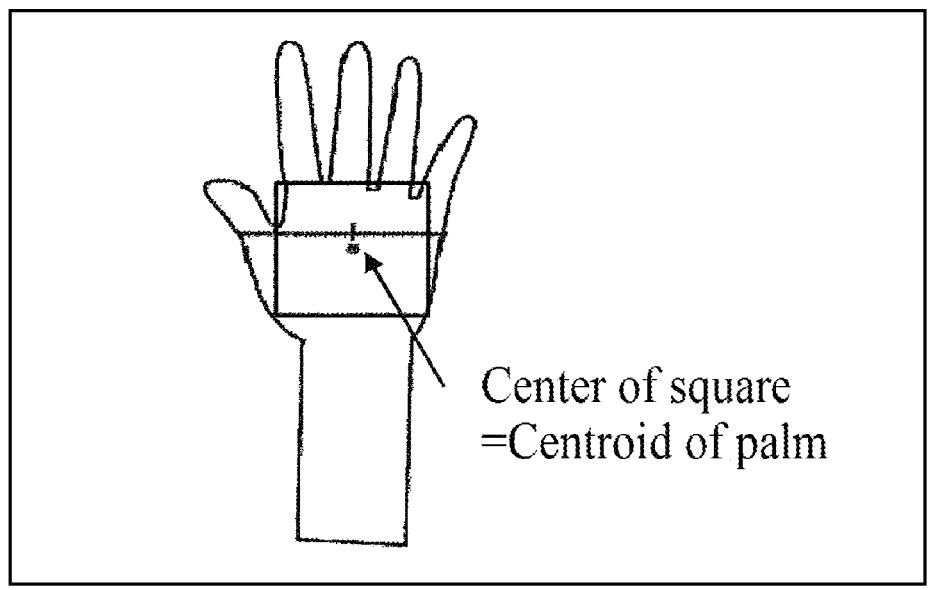

4) The square is further enlarged while shifting the square toward a non-contact edge (to downside in the drawing) in this state, and the enlargement is ended when all the sides come in contact with the edges of the region of a hand (see FIG. 2D).

5) The center of the resultant square is set as the centroid of the palm.

When a hand moves in the horizontal direction relative to the imaging device, the centroid of the palm also moves together. Therefore, the centroid of a palm is used as a factor for understanding the longitudinal and transverse displacement of a hand.

Palm Area Determining Unit

The palm area determining unit 40 has a function of calculating the area of a palm in the region of a hand detected by the hand region detecting unit 20. A method of calculating the area of a palm will be described below with reference to FIGS. 3A, 3B.

Figure 3A:
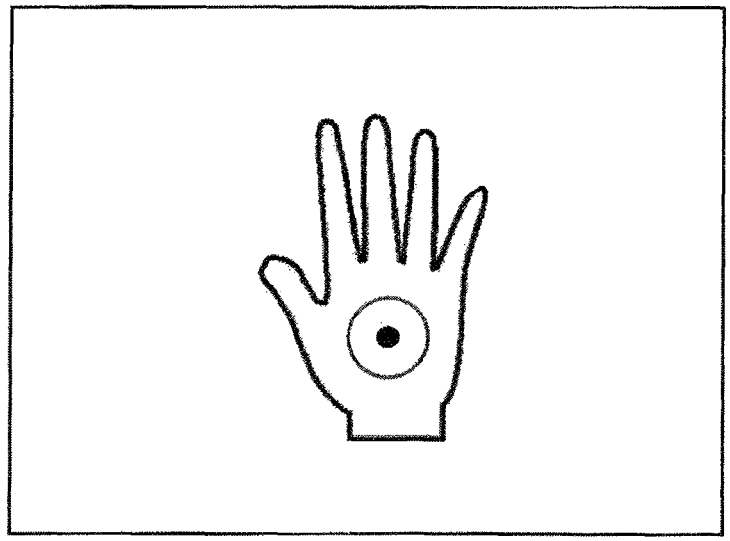
FIGS. 3A, 3B are diagrams illustrating a method of calculating the area of a palm, which is performed by a palm area determining unit according to an embodiment of the invention.

1) A complete circle smaller than the region of a hand is drawn with the centroid determined by the palm centroid determining unit 30 as a center (see FIG. 3A).

Figure 3B:
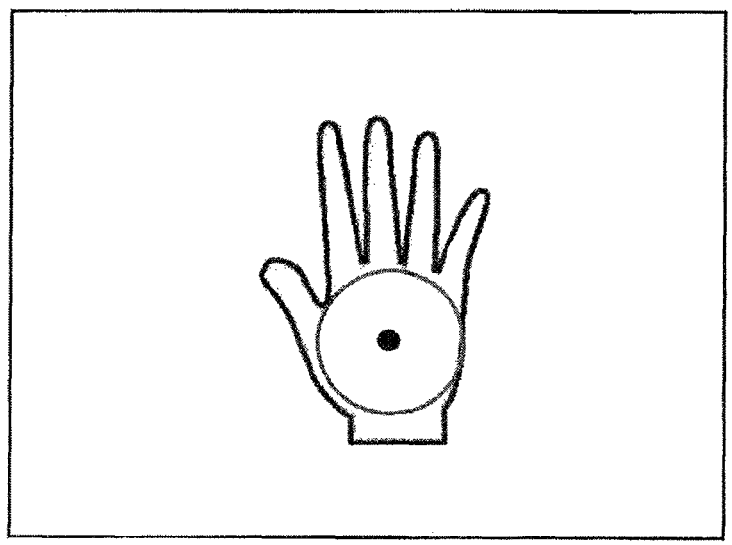

2) The complete circle is enlarged until the circumference of the drawn circle comes in contact with any edge of the region of a hand (see FIG. 3B).

3) The area of the complete circle at this time is set as the area of a palm.

When the distance between a hand and the imaging device is constant, the area of a palm does not depend on the shape of fingers and is always fixed. That is, when the hand moves in the direction in which it gets closer to or apart from the imaging device, which means it moves either front or back, the area of a palm varies. Therefore, the area of a palm is used as a factor for understanding the variation in distance between the imaging device and the hand.

Finger Length/Angle Determining Unit

Figure 4:
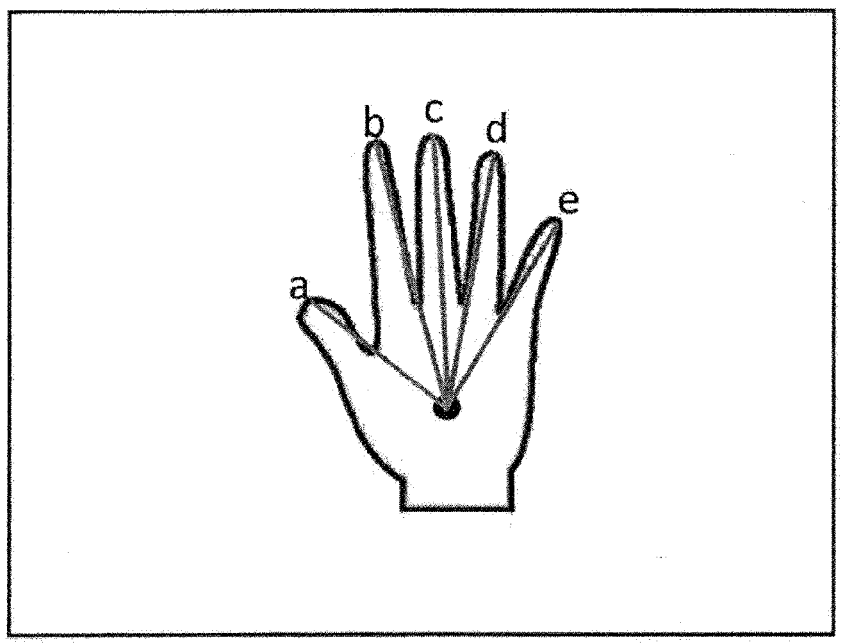
FIG. 4 is a diagram illustrating a method of calculating finger length and angle, which is performed by a finger length/angle determining unit according to an embodiment of the invention.

The finger length/angle determining unit 50 has a function of calculating length and angle of fingers in the region of a hand detected by the hand region detecting unit 20. A method of calculating the length and angle of fingers will be described below with reference to FIG. 4.

1) Intervals from the centroid calculated by the palm centroid determining unit 30 to coordinates of the edges of the region of a hand are calculated.

2) Five coordinates (a, b, c, d, and e in the drawing) are sequentially selected from the largest interval out of the calculated intervals. These coordinates correspond to the coordinates of fingertips.

3) Distances between the selected five coordinates and the centroid are calculated and are added. The resultant value is set as a finger length.

4) Angles formed by lines connecting the fingertips to the centroid and a horizontal line or a vertical line are calculated.

The finger length is used as a factor for determining the shape of hand, e.g., rock, paper, and scissors. The finger angles are used as a factor for determining the rotation of a palm.

Gesture Identifying Unit

The gesture identifying unit 60 has a function of recognizing a gesture of a hand on the basis of the combination of the factors including a displacement of the centroid of a palm calculated by the palm centroid determining unit 30, a variation in area of a palm calculated by the palm area determining unit 40, and variations in finger length and angle calculated by the finger length/angle determining unit 50. Specifically, the gesture identifying unit 60 accesses the storage unit 80 and acquires a gesture corresponding to the combination of the factors.

An example of the relationship between the combination of the factors and the gestures is shown below.

TABLE 1

| Centroid of palm | Area of Palm | Length/angle of fingers | State of hand |
|---|---|---|---|
| Stop | Increase | Increase/fixed | Hand gets closer |
| Move to right | Fixed | Fixed/Fixed | Hand moves to right |
| Stop | Fixed | Increase/fixed | Fingers are unfolded while hand is in the state |
| Move to left | Fixed | Decrease/Fixed | Fingers are folded while moving hand to left |
| Stop | Fixed | Fixed/increase | Hand rotates to left |
| Move to down | Decrease | Decrease/— | Strength-lost state of hand (unintentional motion) |

As shown in Table 1, by combining the factors including the displacement of the centroid of a hand, the variation in area of a palm, and the variations in finger length and angle, it is possible to accurately identify various hand states. In the final row of Table 1, the hand state is described as "unintentional motion". This was proved through the inventors' various experiments and experiences that when a hand is in a strength-lost state, the centroid moves downward, the area of the palm decreases, and the finger length decreases (the finger angle does not matter in this case). Accordingly, this state is defined as an unintentional motion and is distinguished from other intentional motions.

Operation Determining Unit

The operation determining unit 70 accesses the storage unit 80, acquires an operation corresponding to the gesture recognized by the gesture identifying unit 60, and transmits a command corresponding to the acquired operation to the processing unit in the subsequent stage. For example, when the operation corresponding to the state of "a hand moves to right" in Table 1 is "move the cursor to right", the operation determining unit outputs a command for moving the cursor to the right.

Storage Unit

The storage unit has a database function storing the relationship between the combination of the factors including the displacement in the centroid of a hand, the variation in palm area, and the variations in finger length and finger angle and the gesture and the relationship between the gesture and the operation to be executed. The storage unit is implemented by storage means such as a memory, a hard disk, a CD, and a DVD.

Figure 5:
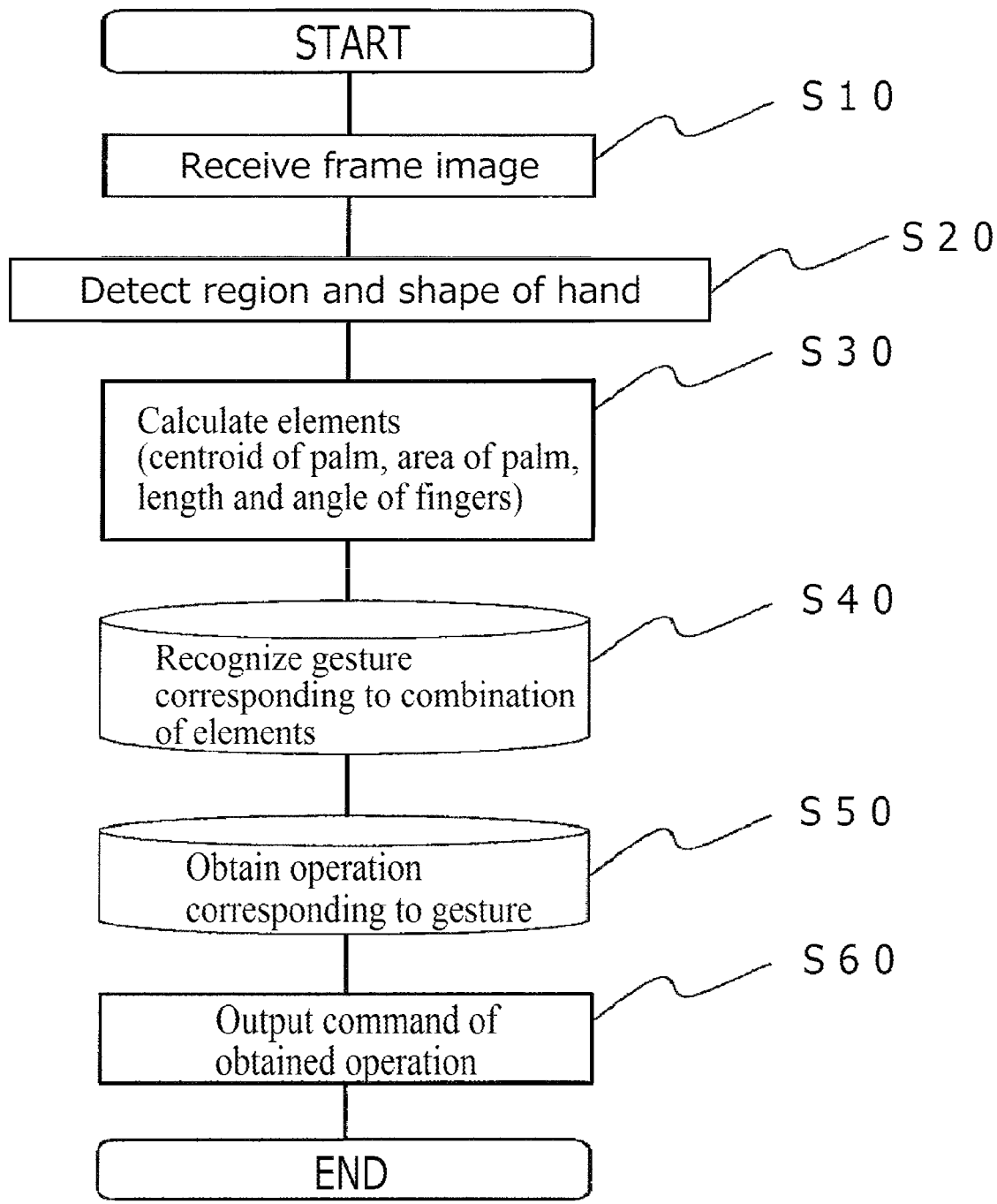
FIG. 5 is a flowchart illustrating a gesture recognition method which is performed by a gesture recognition device according to an embodiment of the invention.

A flowchart illustrating a gesture recognition method performed by the gesture recognition device 1000 having the above-mentioned functional elements is shown in FIG. 5.

In FIG. 5, the gesture recognition device receives frame images (step S10), and detects the region and shape of the hand (step S20). Next, it calculates the elements (centroid of palm, area of palm, length of fingers and angle of fingers) (step S30), and recognize a gesture in accordance with the combination of these elements (step S40). Thereafter, it identifies the operation corresponding to the recognized gesture (step S50), and then it outputs the command of the identified operation (step S60). Examples in which the gesture recognition device 1000 causes the processing unit to execute a predetermined operation will be described below. In the following examples, it should be noted that the processes shown in the flowchart of FIG. 5 are continuously performed.

Example 1

(Operation Details) A menu is displayed on a screen of the processing unit.

(Conditions) Stopping a hand with a single-finger shape at a predetermined position on the screen for a predetermined time (set to 0.5 seconds) causes a starting sign, the process flow is started and a cursor on the screen changes. When the hand stops in this state for a predetermined time (set to 3 seconds), a menu is displayed on the screen.

(Process Details)

Figure 7:
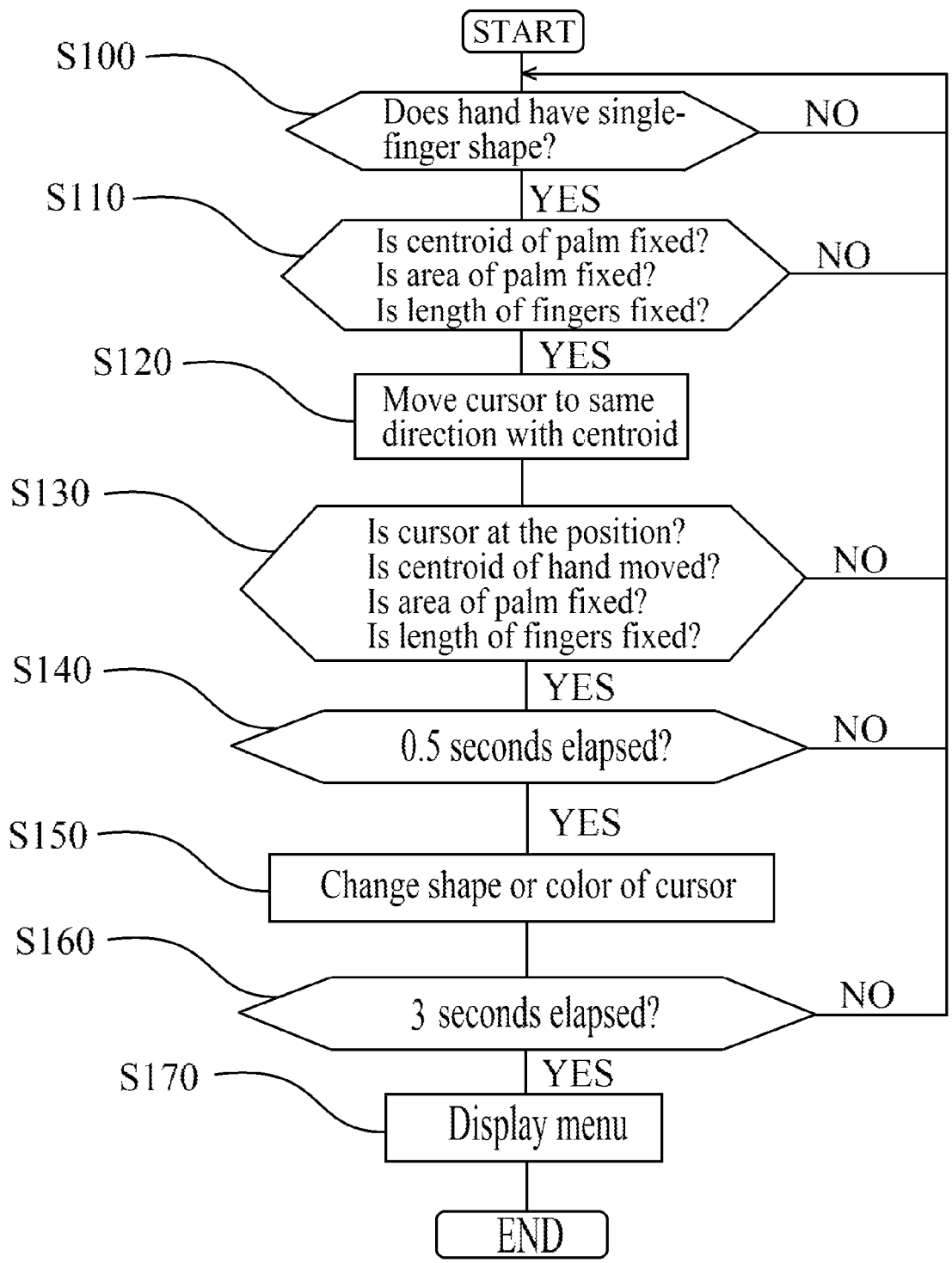
FIG. 7 is a flowchart illustrating Example 1 of the gesture recognition method which is performed by the gesture recognition device according to an embodiment of the invention.

FIGS. 6A-6D are diagrams illustrating the screen of the processing unit and a hand operating the screen with a gesture and FIG. 7 is a flowchart of this process flow. First, the hand region detecting unit 20 determines whether a user's hand has a single-finger shape (step S100). When it is determined that the user's hand has a single-finger shape ("YES" in step S100), the cursor on the screen moves with the movement direction of the centroid of the hand (step 120, FIG. 6A). Then, the gesture identifying unit 60 determines whether the centroid of a palm is varying, the area of the palm is fixed, and the finger length is fixed (step S130). When it is determined that the centroid of the palm is varying, the area of the palm is fixed, and the finger length is fixed ("YES" in step S130), the elapsed time in this state is counted (step S140). When 0.5 seconds elapsed ("YES" in step S140), the shape or color of the cursor on the screen is changed to visually inform the user of a menu to be displayed (step S150) (FIGS. 6B, 6C). When the elapsed time in this state is counted again and 3 seconds elapsed ("YES" in step S160), a menu is displayed on the screen and this process flow is ended (step S170) (FIG. 6D).

Example 2

(Operation Details) An object on the screen is enlarged/reduced.

(Conditions) When a hand has a two-finger shape and the cursor stops at a predetermined position on the screen for a predetermined time (set to 0.5 seconds), that is a starting sign and the process flow is started. In this state, the object displayed on the screen is reduced when the gap between two fingers decreases, and is enlarged when the gap between two fingers increases. When the unintentional motion (see Table 1) is recognized, that is an ending sign and the process flow is ended.

(Process Details)

Figure 8:
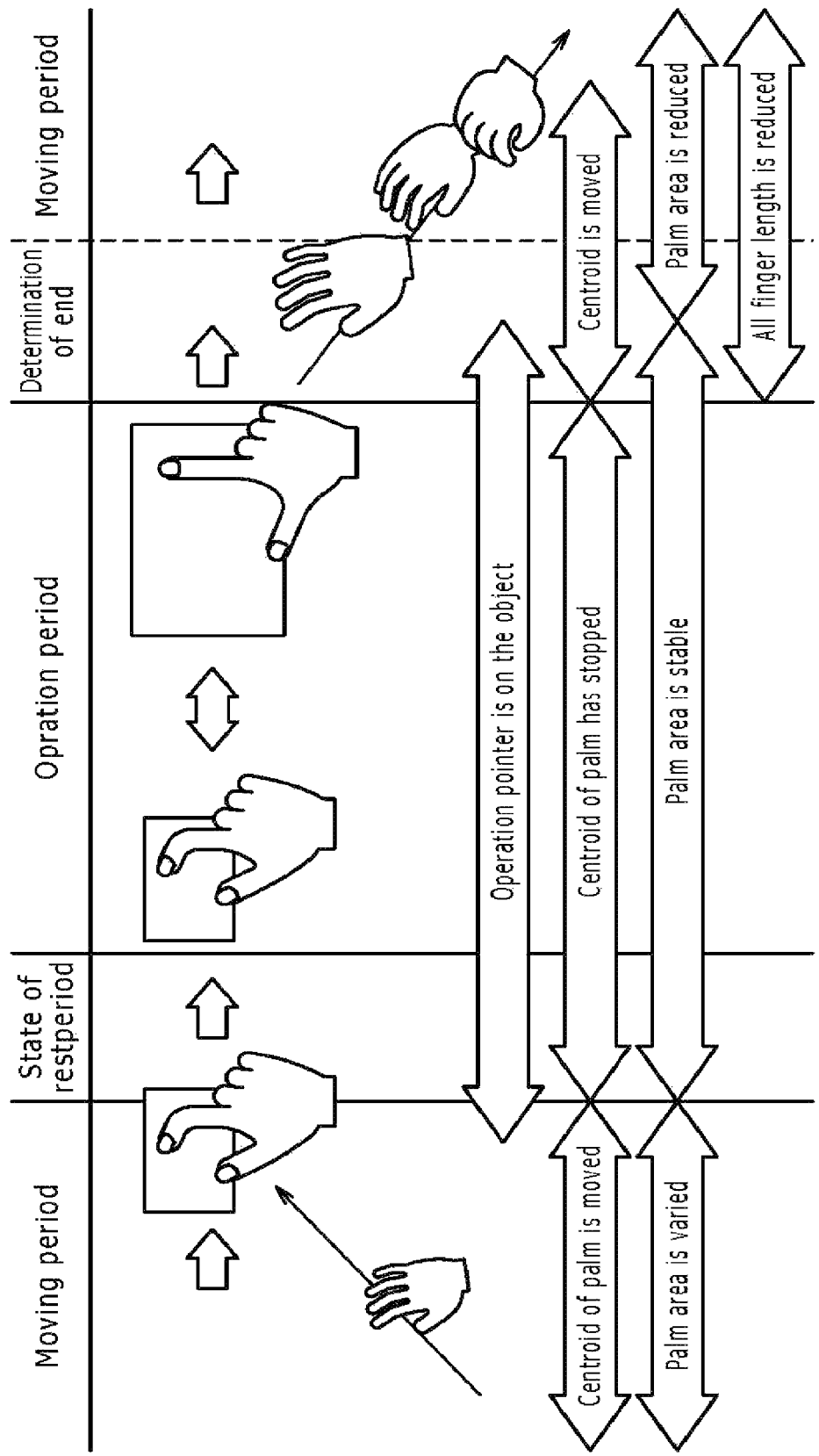
FIG. 8 is a diagram illustrating Example 2 of a gesture recognition method which is performed by a gesture recognition device according to an embodiment of the invention.
Figure 9:
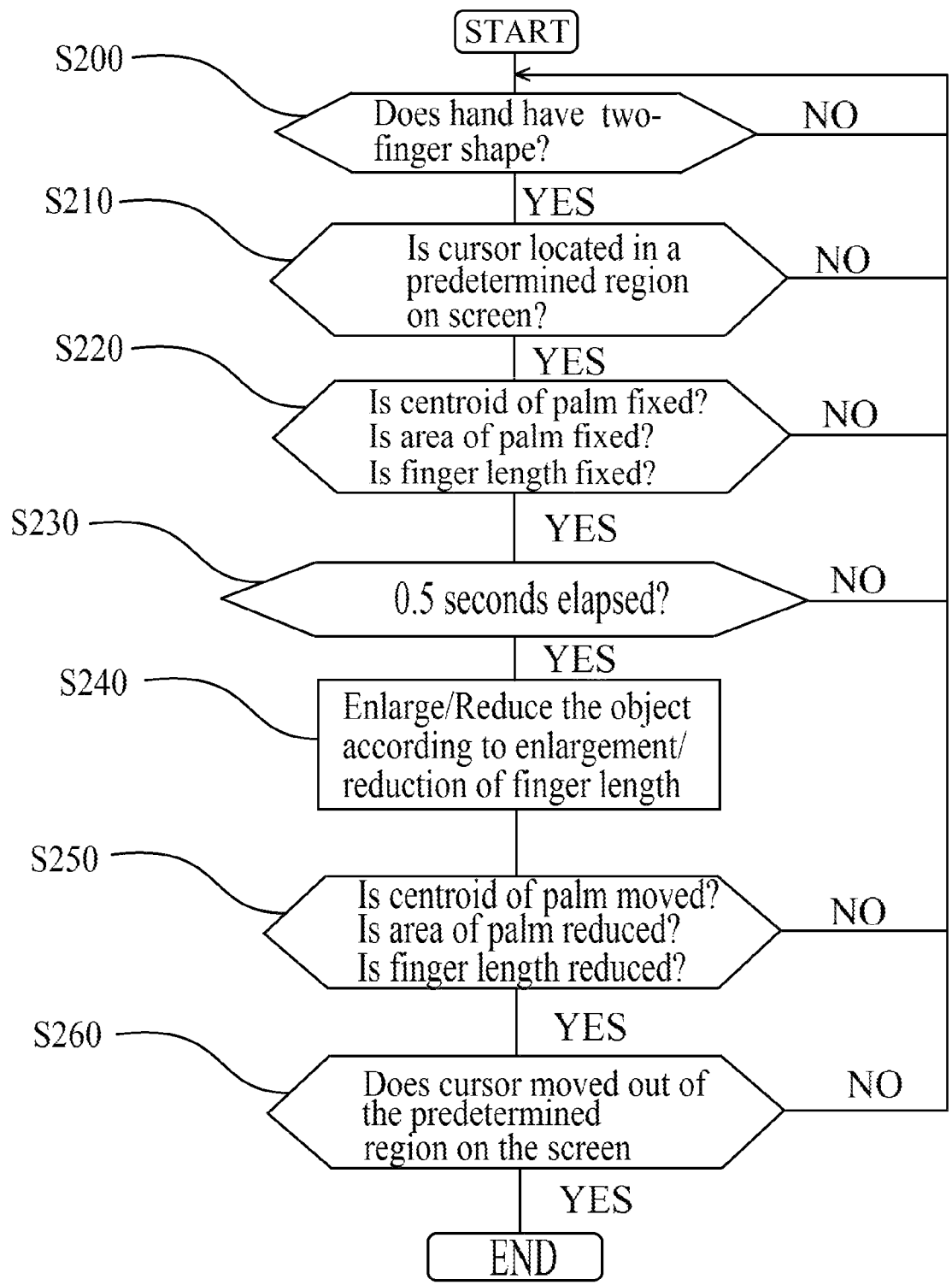
FIG. 9 is a flowchart illustrating Example 2 of the gesture recognition method which is performed by the gesture recognition device according to an embodiment of the invention.

FIG. 8 is a diagram illustrating the correspondence between a user's hand and a screen and FIG. 9 is a flowchart of the processes performed at this time. First, the hand region detecting unit 20 determines whether the user's hand has a two-finger shape (step S200). When it is determined that the user's hand has a two-finger shape ("YES" in step S200), the hand region detecting unit 20 determines whether the cursor is located in a predetermined region on the screen (step S210). When it is determined that the cursor is located at a predetermined position ("YES" in step S210), the gesture identifying unit 60 determines whether the centroid of the palm stops, the area of the palm is fixed, and the finger length is fixed (step S220). When it is determined that the centroid of the palm stops, the area of the palm is fixed, and the finger length is fixed ("YES" in step S220), it is determined that it is instructed to start the operation of enlarging/reducing an object and the elapsed time in this state is counted (step S230). When 0.5 seconds elapsed ("YES" in step S230), the object on the screen is enlarged/reduced with the variation in the finger length, that is, with the enlargement/reduction (step S240). At this time, when it is recognized that the centroid of the palm moves, the area is reduced, and the finger length is reduced, that is, when it is recognized that the user's hand performs the unintentional motion (step S250), and when it is determined that the cursor on the screen moves out of a predetermined region (step S260), it is determined that the operation is ended and the process flow is ended.

Example 3

(Operation Details) An object on the screen rotates/moves.

(Conditions) When the hand has a two-finger shape and the cursor stops in a predetermined region on the screen for a predetermined time (set to 0.5 seconds), that is a starting sign and the process flow is started. When the positions of two fingers move in this state, an object also moves. When the hand rotates, the object also rotates. When the unintentional motion (see Table 1) is recognized, that is an ending sign and the process flow is ended.

(Process Details)

Figure 10:
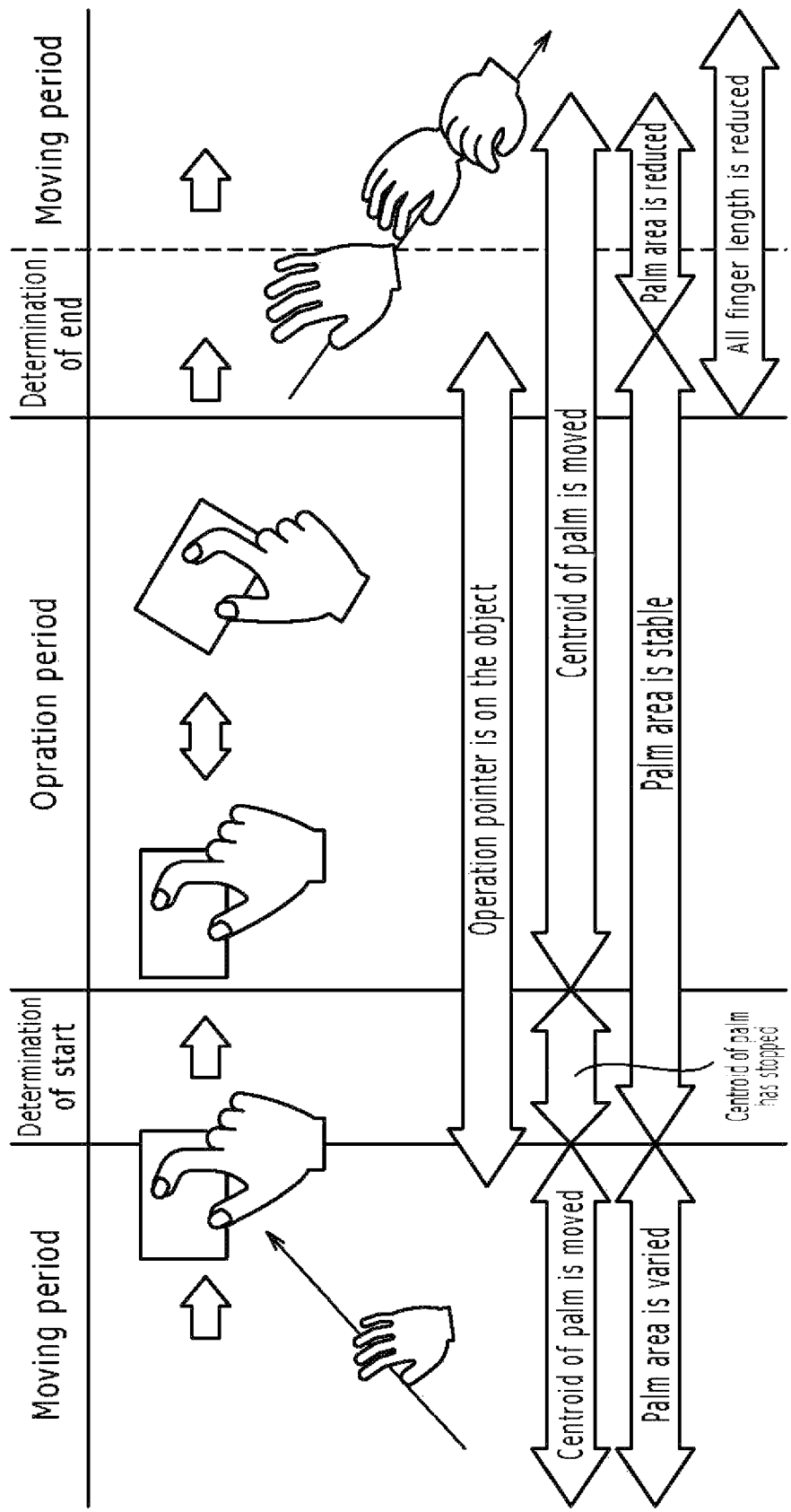
FIG. 10 is a diagram illustrating Example 3 of a gesture recognition method which is performed by a gesture recognition device according to an embodiment of the invention.
Figure 11:
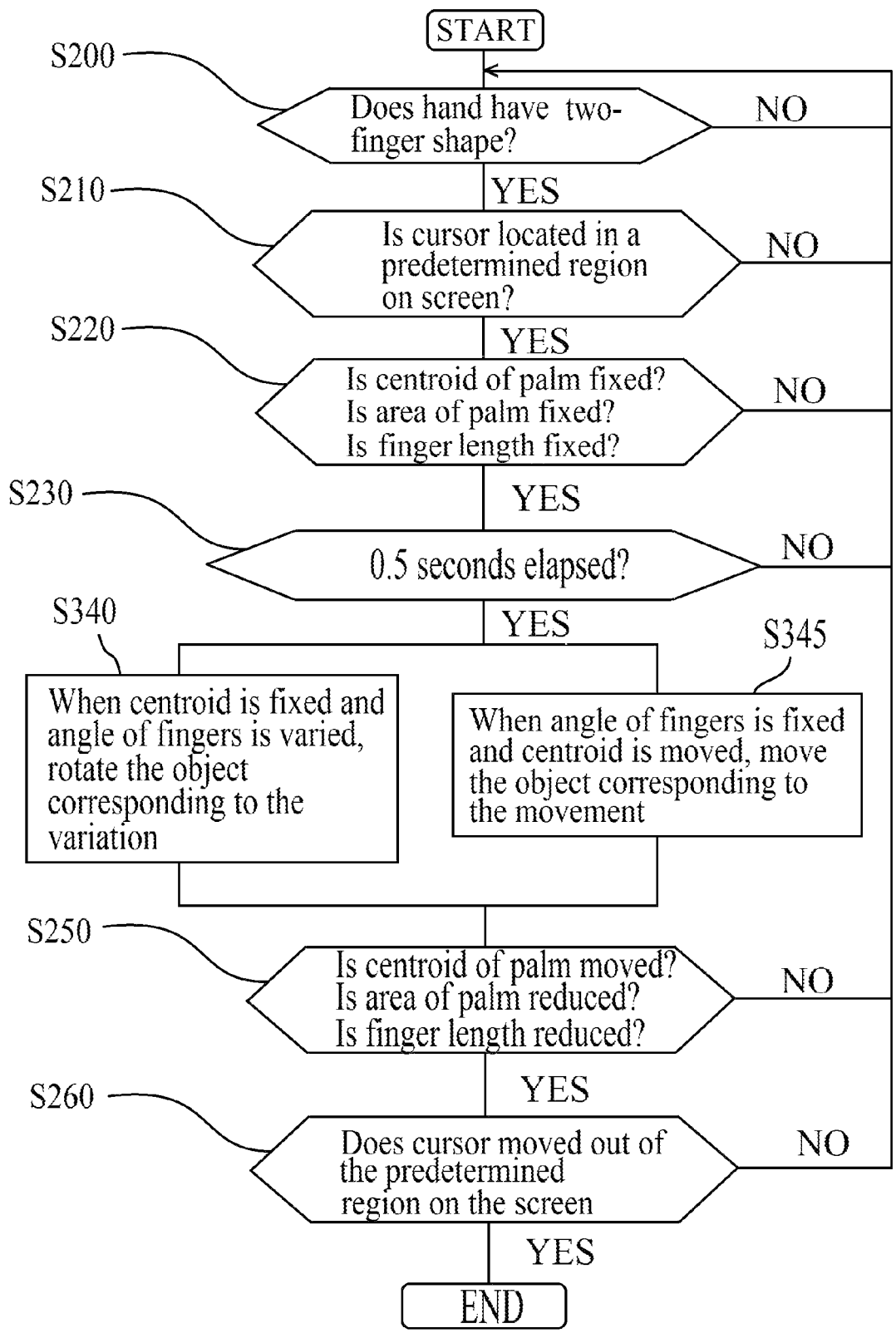
FIG. 11 is a flowchart illustrating Example 3 of the gesture recognition method which is performed by the gesture recognition device according to an embodiment of the invention.

FIG. 10 is a diagram illustrating correspondence between a user's hand and the screen and FIG. 11 is a flowchart illustrating the process flow performed at this time. In this flowchart, the same steps as in the flowchart of FIG. 9 are referenced by the same step numbers and description thereof will not be repeated. After the starting sign is recognized ("Yes" in step S230), it is determined that the centroid of a palm is fixed and the finger angle varies ("YES" in step S230), an object on the screen rotates with the variation in finger angle (step S340). On the other hand, when it is determined that the finger angle is fixed and the centroid of the palm varies, the object on the screen moves with the variation in the centroid of the palm (step S345).

Examples of the operations performed by the gesture recognition device 1000 according to the embodiment of the invention have been described hitherto. However, the process details of the gesture recognition device 1000 are not limited to the above-mentioned examples. For example, a folder, an image, or the like arranged on the screen may be scrolled or transmitted frame by frame in the horizontal or vertical direction by the use of the movement of the user's fingertip. Example 4 where this technique is used will be described below.

Example 4

(Operation Details) An object on a screen moves, rotates, is enlarged, and is reduced.

(Conditions) Stopping a hand with a two-finger shape is for a predetermined time (set to 0.5 seconds) makes a starting sign, the process flow is started. When the positions of two fingers move in this state, the object also moves. When the angles of two fingers are changed, the object rotates. When the gap between two fingers is changed, the object is enlarged or reduced. When the hand with a two-finger shape is stopped for a predetermined time (set to 3 seconds), that is an ending sign and the process flow is ended.

(Process Details)

Figure 12:
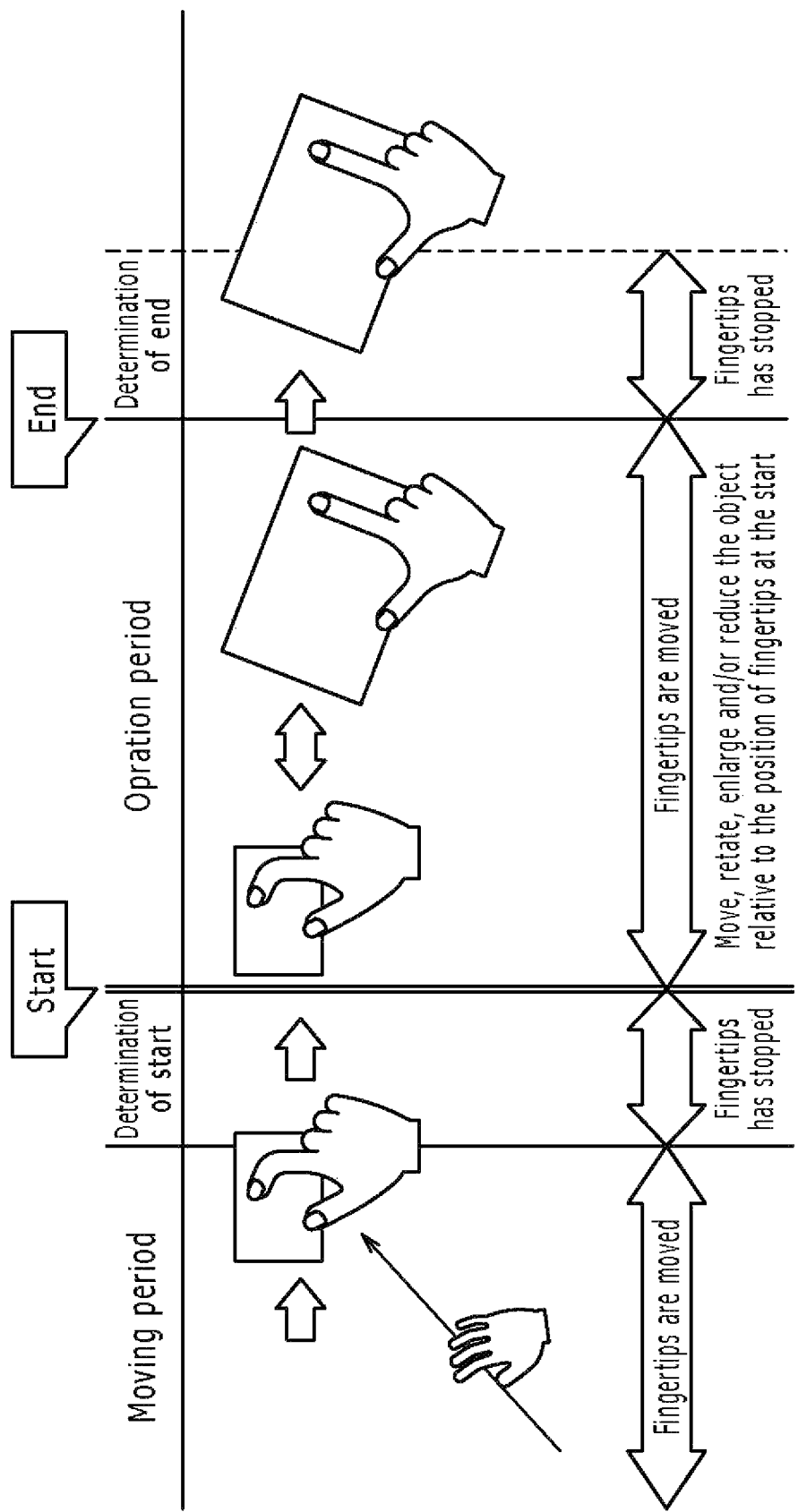
FIG. 12 is a diagram illustrating Example 4 of a gesture recognition method which is performed by a gesture recognition device according to an embodiment of the invention.
Figure 13:
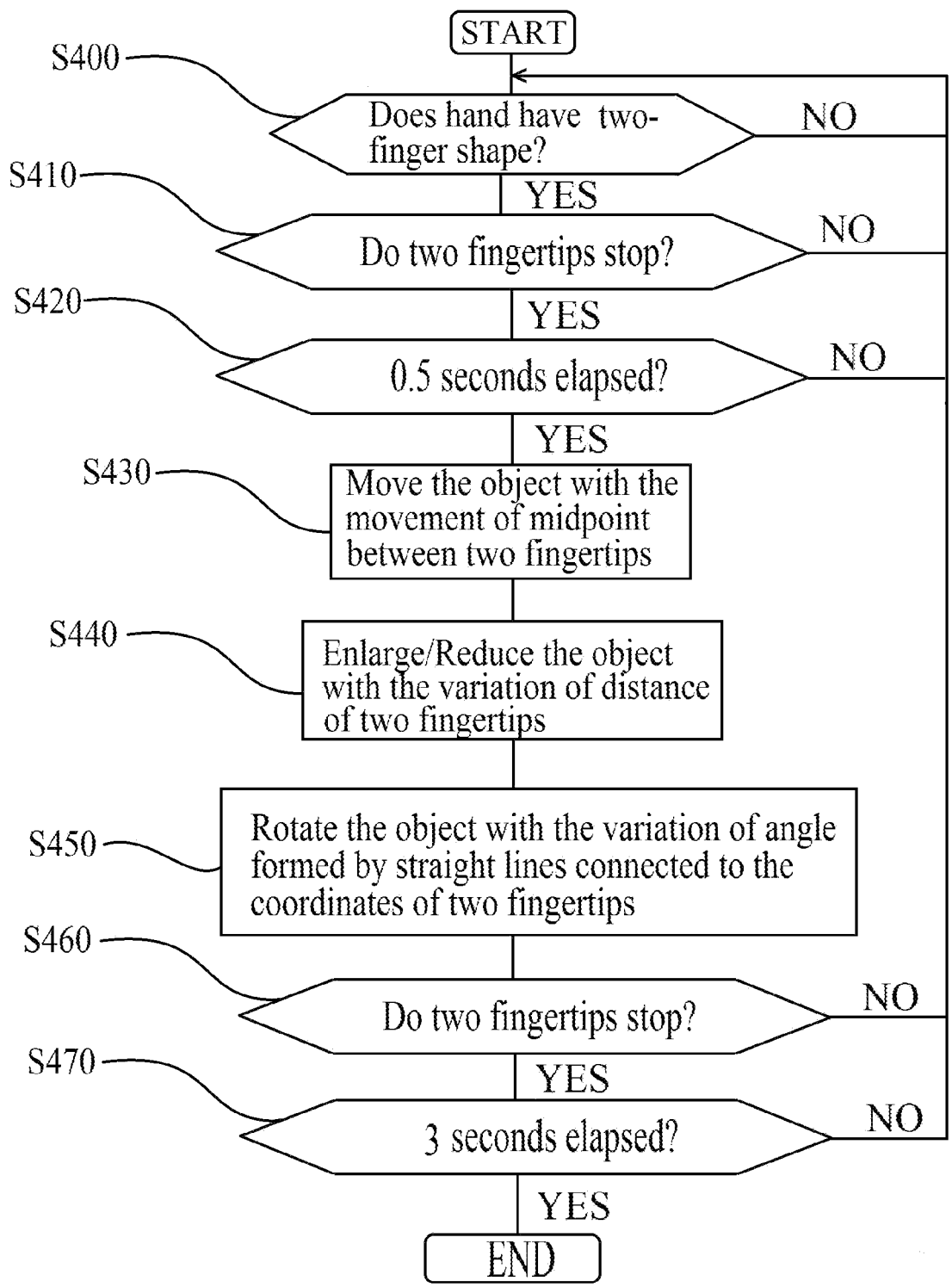
FIG. 13 is a flowchart illustrating Example 4 of the gesture recognition method which is performed by the gesture recognition device according to an embodiment of the invention.

FIG. 12 is a diagram illustrating the correspondence between a user's hand and the screen and FIG. 13 is a flow chart illustrating the process flow performed at this time. First, the hand region detecting unit 20 determines whether the user's hand has a two-finger shape (step S400). When it is determined that the user's hand has a two-finger shape ("YES" in step S400), the gesture identifying unit 60 determines whether the fingertips of two fingers stop, that is, whether the coordinates of the fingertips are fixed (step S410). When it is determined that the fingertips of two finger stop ("YES" in step S410), the elapsed time in this state is counted (step S420). When 0.5 seconds elapsed ("YES" in step S420), it is determined that the operation is started. The coordinates of the fingertips of two fingers at this time are set as reference points. Then, the processes of steps S430, S440, and S450 are performed. For the purpose of convenience of the explanation, these processes are independently performed in the flow chart, but are actually performed at the same time.

The midpoint between the coordinates of the fingertips of two fingers is calculated and an object is moved with the movement of the position of the midpoint (step S430).

The distance between the coordinates of the fingertips of two fingers is calculated and the object is enlarged or reduced with the variation of the distance (step S440). For example, when the distance between the coordinates of the fingertips increases, the object is enlarged with the increase. When the distance therebetween decreases, the object is reduced with the decrease.

The angle of a straight line connecting the coordinates of the fingertips of two fingers is calculated and the object is rotated with the variation of the angle (step S450). For example, when the straight line connecting the coordinates of the fingertips rotates to the right by a predetermined angle, the object is rotated to the right by the predetermined angle.

When it is determined that the coordinates of the fingertips of two fingers stop ("YES" in step S460), the elapsed time in this state is counted (step S470). When 3 seconds elapsed ("YES" in step S470), it is determined that the operation is ended, and thus the process flow is ended.

In the processes of steps S430 to S450, since the motion is determined on the basis of the relative positions of the coordinates of the fingertips, the absolute positions of the coordinates of the fingertips are not considered. Therefore, the positions of the fingertips do not have to be located on an object to be operated and may be located in any region on the screen.

In Examples 1 to 3, the behavior of a hand in the operation period is determined on the basis of the combination of the area of a palm, the finger length, the finger angle, and the like. However, in Example 4, the behavior of the hand is determined on the basis of only the positions of two fingertips. This is based on the grounds that the position of a user's hand is not greatly shaken (not changed) relative to the imaging device during operation. The end of an operation corresponding to a gesture in Example 4 requires a certain time, but the recognition processes are simple. Accordingly, it is possible to suitably follow rapid movement of the fingers.

Examples where the gesture recognition device 1000 causes the processing unit to perform a predetermined operation have been described hitherto. Although not described in the examples, plural finger states may be individually recognized at the same time and plural operations corresponding to the respective finger states may be performed at the same time. Alternatively, gestures of both hands may be recognized at the same time and the operations corresponding to the respective gestures may be performed at the same time.

The processing unit to which the gesture recognition device 1000 according to the embodiment of the invention is applied is not particularly limited. The gesture recognition device may be applied to various apparatuses such as a personal computer, a portable terminal, an ATM, a car navigation apparatus, a vending machine, a mobile phone, and an OA apparatus.

It should be noted that the functions of the gesture recognition device 1000 according to the embodiment of the invention are not limited to specific hardware resources or software processes. That is, any hardware (such as an electronic circuit), software (program), or combinations thereof may be used, as long as these functions can be embodied.

When the gesture recognition method according to the embodiment of the invention is implemented as a program, the program may be downloaded to an information processing apparatus performing the method from an external server or may be distributed in the form of a computer-readable medium. Examples of the computer-readable medium include a CD-ROM, a DVD, a magnetic tape, a flexible disk, a magneto-optical disk, a hard disk, and a memory medium.

While the invention has been described with reference to the embodiments shown in the drawings, the embodiments are only exemplary and those skilled in the art will understand that the invention can be changed or modified in various forms without departing from the scope and concept of the invention. Therefore, the scope of the invention should not be determined by the above-mentioned embodiments, but should be determined depending on the technical concept described in the appended claims.

LIST OF REFERENCE NUMERALS

10: FRAME IMAGE RECEIVING UNIT
20: HAND REGION DETECTING UNIT
30: PALM CENTROID DETERMINING UNIT
40: PALM AREA DETERMINING UNIT
50: FINGER LENGTH/ANGLE DETERMINING UNIT
60: GESTURE IDENTIFYING UNIT
70: OPERATION DETERMINING UNIT
80: STORAGE UNIT
1000: GESTURE RECOGNITION DEVICE

The invention claimed is:

1. A gesture recognition device mounting on a processing unit, recognizing a gesture of a human hand in a free space through a moving image, and causing said processing unit to execute a predetermined operation corresponding to the recognized gesture, said gesture recognition device comprising:
   a palm centroid determining unit for determining a centroid of a palm of a hand;
   a palm area determining unit for determining the area of the palm of the hand;
   a finger length determining unit for calculating length between the centroid of the palm and fingertips;

a finger angle determining unit for calculating angles formed by lines connecting the centroid and the fingertips; and a gesture identifying unit for identifying a gesture from a combination of a variation of the centroid of the palm, a variation of the area of the palm, and a variation of the angles formed by lines connecting the centroid and the fingertip;

said gesture identifying unit determining the palm is rotated when the angle formed by lines connecting the centroid and the fingertips is varied.

2. A gesture recognition device according to claim 1, wherein said gesture is one of a gesture showing a start of operation, a gesture showing execution of operation, and a gesture showing an end of operation.

3. A gesture recognition device according to claim 1, wherein said gesture identifying unit determining an operation is ended when the centroid of the palm is moved downward, the area of the palm decreases, and the length between the centroid and the fingertips is made shorter.

4. A gesture recognition device according to claim 1, the operations executed by said processing unit is to display a menu on a screen of said processing unit, to change an object displayed on the screen of said processing unit, to move and rotate the object displayed on the screen of said processing unit, and to transmit a plurality of images displayed on the screen of said processing unit frame by frame or scroll.

5. A gesture recognition device according to claim 1, said gesture identifying unit recognizes plural gestures simultaneously, and causes said processing unit to execute operations corresponding to the recognized gestures simultaneously.

6. A gesture recognition device according to clam 1, said processing unit is one of a personal computer, a portable terminal, a car navigation system, and a portable telephone.

7. A method of recognizing a gesture of a human hand in a free space through a moving image, causing a processing unit to execute a predetermined operation corresponding to the recognized gesture, the method for recognizing a gesture comprising:

a step of determining a centroid of a palm of a hand;

a step of determining the area of the palm of the hand;

a step of calculating length between the centroid of the palm and fingertips;

a step of calculating angles formed by lines connecting the centroid and the fingertips; and a step of identifying said gesture from a combination of a variation of the centroid of the palm, a variation of the area of the palm, a variation of the area of the palm, and a variation of the angles formed by lines connecting the centroid and the fingertips;

in said step of identifying a gesture, it being determined that the palm is rotated when the angle formed by lines connecting the centroid and the fingertips is varied.

8. A method of recognizing a gesture according to claim 7, wherein said gesture includes a gesture showing a start of operation, a gesture showing execution of operation, and a gesture showing an end of operation.

9. A method for recognizing a gesture according to claim 7, wherein said gesture identifying unit determines that an operation is ended when the centroid of the palm is moved downward, the area of the palm decreases, and the length between the centroid and the fingertips is made shorter.

10. A method for recognizing a gesture according to claim 7, the operations executed by said processing unit is to display a menu on a screen of said processing unit, to change an object displayed on the screen of said processing unit, to move and rotate the object displayed on the screen of said processing unit, and to transmit a plurality of images displayed on the screen of said processing unit frame by frame or scroll.

\* \* \* \* \*